US006912193B2

(12) United States Patent
Cho et al.

(10) Patent No.: US 6,912,193 B2
(45) Date of Patent: Jun. 28, 2005

(54) RECORD CONDITION EXTRACTION SYSTEM AND METHOD OF DIELECTRIC RECORDING MEDIUM, AND INFORMATION RECORDING APPARATUS

(75) Inventors: Yasuo Cho, 4-5-304, Komegafukuro 2-chome, Aoba-ku, Sendai-shi, Miyagi-ken (JP); Atsushi Onoe, Tsurugashima (JP)

(73) Assignees: Yasuo Cho, Miyagi-ken (JP); Pioneer Corporation, Tokyo-to (JP)

( * ) Notice: Subject to any disclaimer, the term of this patent is extended or adjusted under 35 U.S.C. 154(b) by 346 days.

(21) Appl. No.: 10/354,101

(22) Filed: Jan. 30, 2003

(65) Prior Publication Data

US 2003/0142614 A1 Jul. 31, 2003

(30) Foreign Application Priority Data

Jan. 31, 2002 (JP) ........................................ 2002-024663
Mar. 26, 2002 (JP) ........................................ 2002-086592

(51) Int. Cl.$^7$ .............................................. G11B 9/00
(52) U.S. Cl. .................................... 369/126; 369/53.38
(58) Field of Search ........................... 369/47.5, 47.51, 369/53.26, 53.27, 53.2, 53.31, 53.41, 53.38, 53.44, 110.01, 121, 126

(56) References Cited

U.S. PATENT DOCUMENTS

| 5,418,029 A | 5/1995 | Yamamoto et al. |
| 5,946,284 A | 8/1999 | Chung et al. |
| 6,001,519 A | * 12/1999 | Yang et al. ..................... 430/20 |

FOREIGN PATENT DOCUMENTS

| EP | 0 739 004 A | 11/1996 |
| EP | 1 154 422 A | 11/2001 |

OTHER PUBLICATIONS

Matsuura et al, "Fundamental Study on Nano Domain Engineering Using Scanning Nonlinear Dielectric Microscopy", Jpn. J. Appl. Phys. vol. 40 (2001) pp. 4354–4356, Part 1, No. 6B Jun. 2001.

* cited by examiner

Primary Examiner—Paul W. Huber
(74) Attorney, Agent, or Firm—Nixon & Vanderhye P.C.

(57) ABSTRACT

The record condition extraction system (1) of a dielectric recording medium is intended to obtain an applied voltage and an applied time length to be recorded when recording information in the dielectric recording medium. The record condition extraction system (1) is provided with: an applied voltage setting device (11); an applied time length setting device (12); a record control device (13); an applied voltage/applied time length record device (14); a record device (15); a dot radius measurement device (16); a dot radius record device (17); an optimum dot radius detection device (18); a record condition determination device (19); and an output device (20). The applied voltage setting device (11) and the applied time length setting device (12) set a voltage and a time applied to a probe (31) of the record device (15), respectively. The dot radius of a polarization domain 38, which is recorded at the record device (15), is measured at the dot radius measurement device (16), and the optimum polarization domain (38) is obtained at the optimum dot radius detection device (18). The applied voltage and the applied time length which have formed the polarization domain (38) are extracted as an optimum record condition.

25 Claims, 11 Drawing Sheets

RECORD CONDITION EXTRACTION SYSTEM AND METHOD OF DIELECTRIC RECORDING MEDIUM, AND INFORMATION RECORDING APPARATUS

BACKGROUND OF THE INVENTION

1. Field of the Invention

The present invention relates to a record condition extraction system for and a record condition extraction method of obtaining an optimum record condition of a dielectric recording medium which records information in a microdomain of a dielectric substance with high density, as well as an information recording apparatus.

2. Description of the Related Art

Recently, many types of dielectric materials and piezoelectric materials have been developed, and most of them are used for ultrasonic elements, optical elements, a memory, and the like. In accordance with the fact, a method of measuring a remanent polarization distribution of the dielectric material and local anisotropy of the piezoelectric material has been developed. Also, by using this technique, another technique of recording information in the dielectric material and reproducing the information has been developed.

Conventionally, in order to observe a polarization domain of the dielectric substance, there is a method of using the difference of etching rates in a plane direction by chemical etching. However, only resolution on the order of $\mu$m can be expected in this method, and it requires time because of the need to pass through processes of the chemical etching and the like until the actual observation. With respect to the microdomain, there is a method of applying a high-frequency voltage to the dielectric material with an AFM (Atomic Force Microscope) apparatus and using piezoelectric response at that time. In this method, however, it is difficult to obtain a detection signal having enough S/N ratios to the microdomain on the order of nm.

The inventors of the present invention have developed a SNDM (Scanning Nonlinear Dielectric Microscopy) to form and observe the microdomain. This apparatus can observe the polarization domain of the dielectric substance on the order of Å and form an artificial polarization domain by the application of an electric field to the dielectric substance. However, there is hardly any concrete condition extraction method of forming with good reproducibility a micro polarization domain that has a stable level for recording and reproducing.

If the polarization domain is formed in the dielectric material and this is recorded as information, it is necessary to partially align the polarization of the dielectric substance with the direction of an outer electric field by applying, from outside, the electric field whose intensity is stronger than that of the coercive electric field of the dielectric material. The inventors of the present invention have formed the microdomains on the order of sub $\mu$m to PZT film and LiTaO$_3$ crystal using the above described SNDM, but they are not sufficiently stable. At the same time, few researchers report the technique on the formation of a stable sub $\mu$m microdomain, which is appropriate for recording and reproducing with high recording density to the dielectric material, in the current situation.

SUMMARY OF THE INVENTION

It is therefore an object of the present invention to provide a record condition extraction system and a record condition extraction method of the dielectric recording medium, as well as an information recording apparatus, in order to form a high-density and stable microdomain in the electric material.

The above object of the present invention can be achieved by a record condition extraction system of a dielectric recording medium for applying a voltage to the dielectric recording medium with a probe and extracting a record condition for recording information. The record condition extraction system is provided with an applied voltage setting device for setting an applied voltage to be applied to the dielectric recording medium; an applied time length setting device for setting an applied time length of the set applied voltage; a polarization domain formation device for applying a voltage to the dielectric recording medium from the probe on the basis of the set applied voltage and the set applied time length to form a polarization domain; and a measurement device for measuring a size of the polarization domain formed by the polarization domain formation device.

According to the record condition extraction system of the dielectric recording medium, for the purpose of recording in the dielectric recording medium, it becomes possible to determine an optimum applied voltage to be applied to an electrode and an optimum applied time length of applying the applied voltage. The optimum applied voltage and the optimum applied time length are an applied voltage and an applied time length that form a stable and the smallest polarization domain. The applied time length is an applied pulse width and determines a recording speed when recording information sequentially, so that it is preferable as short as possible.

The optimum applied voltage and the optimum applied time length are obtained by applying a voltage to the dielectric recording medium by some combinations of the applied voltage and the applied time length, measuring the size of the polarization domain formed at that time, and examining data on the size of the obtained polarization domain, the applied voltage, the applied time length, and the like.

The material and the thickness of the dielectric material, a probe radius, and the like affect on the formation of the polarization domain. At a recording apparatus using the material and the thickness of the same dielectric substance, and the same probe radius, it becomes possible to set a record condition capable of forming the most stable polarization domain at the highest speed and with the highest density by setting the applied voltage and the applied time length as obtained above.

In one aspect of the record condition extraction system of the dielectric recording medium, it is provided with a detection device for detecting whether or not the polarization domain formed in the dielectric recording medium is stable and the smallest on the basis of a measurement result by the measurement device.

According to this aspect, the smallest polarization domain which is formed by various combinations of the applied voltage and the applied time length and in which the polarization domain does not disappear and is held, i.e. the stable and the smallest polarization domain is detected from the data on the measured polarization domains. For example, there is a point at which it becomes difficult to hold without the disappearance of the polarization domain because of a rapid decrease of the polarization domain formed in response to the decrease of the applied voltage and the applied time length. The polarization domain at that time is detected.

In another aspect of the record condition extraction system of the dielectric recording medium, it is further provided with a condition determination device for determining the applied voltage and the applied time length that have formed the polarization domain as an optimum record condition if the polarization domain is detected as being stable and the smallest by the detection device.

According to this aspect, if the stable and the smallest polarization domain is detected by the detection device, the applied voltage and the applied time length at that time are determined and extracted as the optimum record condition for forming the polarization domain with high density and at high speed. Therefore, if the stable and the smallest polarization domain can be learned (regardless of a visual observation or an automatic detection), it is possible to determine the optimum condition of the applied voltage and the applied time length on the basis of it.

The term "the smallest" with respect to the term "the size of the polarization domain" related to the present invention does not mean an ideal nor literal minimum value, but means that it depends on the resolution and the reproducibility of the record condition extraction system and that it has some degree of width or range from the ideal or literal minimum value to the side where the polarization domain stabilizes such as a high voltage side or a long time length side. The width or the range related to "the smallest" is determined according to the resolution and the reproducibility of the record condition extraction system, experimentally, experientially, theoretically, or by simulation, and it is not limited to a physical change itself. "The optimum" record condition about the applied voltage and the applied time length indicates the value of the applied volume and the applied time length that form "the smallest" polarization domain in the above meaning.

In another aspect of the record condition extraction system of the dielectric recording medium, it is provided with another condition determining device for determining an allowable range in the size of the polarization domain on the basis of the size of the polarization domain which is stable and the smallest detected by said detection device, and determining an applied voltage and an applied time length which are needed for forming the polarization domain having a size within the allowable range.

The aforementioned condition determining device determines the applied voltage and the applied time length which is needed to form one size of the polarization domain which is stable and the smallest detected by the detection device. However, the condition determining device according to this aspect determines an allowable range in the size of the polarization domain on the basis of the size of the polarization domain which is stable and the smallest detected by the detection device, and determines an applied voltage and an applied time length which are needed for forming the polarization domain having a size within the allowable range. Theoretically, the size of the polarization domain which is stable and the smallest is one. However, actually, it is allowed to change the size of the polarization domain within an allowable range. The allowable range is determined, for example, on the basis of functional conditions of an information recording or reproducing apparatus, More concretely, it is determined so as to keep the limitation of record speed or record density of an information recording or reproducing apparatus. Thus, it is possible to improve degree of freedom about setting of the voltage applied time length or setting of the polarization domain size.

In another aspect of the record condition extraction system of the dielectric recording medium, a plurality of polarization domains are formed by setting a plurality of applied voltages with the applied voltage setting device with respect to a predetermined applied time length set with the applied time length setting device.

According to this aspect, firstly, the time length of applying, i.e. the pulse width is set, and various levels of voltages are applied with the pulse width to form the polarization domains sequentially. After sequentially changing the voltage within a predetermined range and applying it, a next pulse width is set and the voltage is applied in the same manner, thereby collecting data. The data on the applied voltage, the applied time length, and the polarization domain can be obtained quickly and in full.

In another aspect of the record condition extraction system of the dielectric recording medium, the applied voltage setting device is provided with: a device for setting an initial voltage of the applied voltage; a device for setting a step voltage to be added to the initial voltage; and a device for setting the number of adding the step voltage, the applied voltage setting device sequentially adding the step voltage to the applied voltage whenever forming the polarization domain and automatically setting the applied voltage until reaching the set number.

According to this aspect, the applied voltage is sequentially obtained by an operation according to a predetermined rule, then, the obtained voltage is sequentially applied to the probe for a predetermined time length, and the polarization domain is automatically formed. For example, if the initial applied voltage is $V_0$, the step voltage $\Delta V$, and the number of execution $n_0$, the n-th applied voltage V is operated by $V=V_0+\Delta V \times n$ ($n \leq n_0$), and the voltage is applied.

In another aspect of the record condition extraction system of the dielectric recording medium, a plurality of polarization domains are formed by setting a plurality of applied time length with the applied time length setting device with respect to a predetermined applied voltage set with the applied voltage setting device.

According to this aspect, firstly, the voltage to be applied is set, and the applied voltage is applied with various pulse widths to form the polarization domains. After changing the pulse width within a predetermined range and applying it, a next applied voltage is set and the polarization domain is formed in the same manner, thereby collecting data The data on the applied voltage, the applied time length, and the polarization domain can be obtained quickly and in full.

In another aspect of the record condition extraction system of the dielectric recording medium, the applied time length setting device is provided with: a device for setting an initial time length of the applied time length; a device for setting a step time length to be added to the initial time length; and a device for setting the number of adding the step time length, said applied time length setting device sequentially adding the step time length to the applied time length whenever forming the polarization domain and automatically setting the applied time length until reaching the set number.

According to this aspect, the applied time length is sequentially obtained by an operation according to a predetermined rule, then, the applied voltage which is set is sequentially applied for the operated time length, and the polarization domain is automatically formed. For example, if the initial applied time length is $T_0$, the step time length $\Delta T$, and the number of execution $m_0$, the n-th applied length T is operated by $T=T_0+\Delta T \times m$ ($m \leq m_0$), and the applied voltage is applied with the pulse width.

In another aspect of the record condition extraction system of the dielectric recording medium, it is provided with a memory device for memorizing: the applied voltage which is set by the applied voltage setting device and which is applied; the applied time length which is set by the applied time length setting device and for which the applied voltage is applied; and the size of the polarization domain measured by the measurement device.

According to this aspect, the voltage to be applied, the time length of applying, and the size of the polarization domain formed at that time are recorded or memorized with respect to all of the combination of the applied voltage and the applied time length. They are used as data when obtaining the optimum record condition.

In another aspect of the record condition extraction system of the dielectric recording medium, information on the material and the thickness of the dielectric recording medium and on the radius of the probe applying the applied voltage is further memorized in the memory device.

According to this aspect, the material and the thickness of the dielectric material to be used and the radius of the probe to be used are recorded or memorized as data in addition to the voltage to be applied, the time length of applying, and the size of the polarization domain formed at that time. The information on these is used as the data when obtaining the optimum record condition.

In another aspect of the record condition extraction system of the dielectric recording medium, it is provided with an output device for outputting in a predetermined format: applied voltage information indicating the applied voltage which is set by the applied voltage setting device and which is applied; applied time length information indicating the applied time length which is set by the applied time length setting device and for which the applied voltage is applied; and size information indicating the size of the polarization domain measured by the measurement device.

According to this aspect, it is possible to output in the predetermined format the information on the voltage to be applied, the time length of applying and the size of the polarization domain formed at that time in any case. For example, as the output device there are a personal computer, a printer, a monitor, and the like. It is also possible to obtain the optimum condition by a visual observation from the data outputted with the output device.

In another aspect of the record condition extraction system of the dielectric recording medium, the detection device detects whether or not the polarization domain formed in the dielectric recording medium is stable and the smallest on the basis of information memorized in the memory device.

According to this aspect, the stable and the smallest polarization domain formed is chosen on the basis of the memorized data on the polarization domain. It is possible to operate with a computer in a statistical method by using the data, and it is also possible to operate the optimum size which is not formed actually.

In another aspect of the record condition extraction system of the dielectric recording medium, information on the polarization domain which is stable and the smallest and which is detected by the detection device and on its size is outputted from the output device with information on the applied voltage which is set by the applied voltage setting device and which is applied and information on the applied time length which is set by the applied time length setting device and for which the applied voltage is applied.

According to this aspect, the size of the optimum polarization domain obtained is outputted to a personal computer, a printer, a monitor, and the like with the information on the applied voltage and the applied time length obtained when forming the polarization domain. If the applied voltage and the applied time length at this time are not actually used for the formation of the polarization domain, the optimum value can be operated by a computer and outputted.

In another aspect of the record condition extraction system of the dielectric recording medium, the shortest applied time length setting by the applied time length setting device is performed on the basis of the value of coercive electric field intrinsic in the dielectric recording medium.

According to this aspect, the minimum value of the applied voltage set initially is a voltage that can form an electric field countering the value of the coercive electric field of the dielectric material to be used. Because of this, it is possible to learn the lower limit value of the voltage to be applied and avoid testing the formation of the polarization domain in the range of the voltage of no use.

In another aspect of the record condition extraction system of the dielectric recording medium, a dielectric material of the dielectric recording medium is a ferroelectric material.

According to this aspect, the ferroelectric material is used as a medium material.

In another aspect of the record condition extraction system of the dielectric recording medium, a dielectric material of the dielectric recording medium is $LiTaO_3$.

According to this aspect, $LiTaO_3$, which can easily reverse the polarization regardless of the electric field applied by the probe because of its low dielectric constant, is used as the medium material, and the form as the dielectric recording medium can be easily constructed so as to record onto Z surface of $LiTaO_3$ on which + surface and − surface of the polarization have a relation of 180 degree domain.

In another aspect of the record condition extraction system of the dielectric recording medium, it is provided with a scanning nonlinear dielectric microscopy as the measurement device for measuring the size of the polarization domain.

According to this aspect, it is possible to measure the size of the polarization domain accurately and quickly with the scanning nonlinear dielectric microscopy.

The above object of the present invention can be achieved by a record condition extraction method of a dielectric recording medium of applying a voltage to the dielectric recording medium with a probe and extracting a record condition for recording information. The record condition extraction method is provided with: an applied voltage setting process of setting an applied voltage to be applied to the dielectric recording medium; an applied time length setting process of setting an applied time length of the set applied voltage; a polarization domain formation process of applying the applied voltage to the dielectric recording medium on the basis of the set applied voltage and the set applied time length to form a polarization domain; a measurement process of measuring a size of the polarization domain formed in the polarization domain formation process; a detection process of detecting whether or not the polarization domain formed in the dielectric recording medium is stable and the smallest; and a condition determination process of determining an applied voltage and an applied time length that have formed the polarization domain as an optimum record condition if the polarization domain is detected as being stable and the smallest in the detection process.

According to the record condition extraction method of the dielectric recording medium, for the purpose of high-density or high-speed recording in the dielectric recording medium, an optimum applied voltage to be applied to an electrode and an optimum time length of applying the applied voltage, i.e. the pulse width are determined.

In the applied voltage setting process and the applied time length setting process, an application condition of the voltage to be applied to the probe, i.e. the applied voltage and the applied time length are set. In the polarization domain formation process, the probe abuts onto the dielectric substance, the voltage is applied according to the application condition of the set voltage, thereby forming the polarization domain. In the measurement process, the size of the formed polarization domain is measured. In the detection process, the stable and the smallest polarization domain is detected from the polarization domains formed under the various application conditions of the voltage. Moreover, in the condition determination process, the applied voltage and the applied time length obtained when forming the optimum polarization domain are determined as the optimum record condition from the optimum polarization domain detected in the detection process.

After passing through the above processes, it is possible to extract the applied voltage and the applied time length appropriate for the high-density and high-speed recording.

In one aspect of the record condition extraction method of the dielectric recording medium, it is provided with another condition determining process of determining an allowable range in the size of the polarization domain on the basis of the size of the polarization domain which is stable and the smallest detected in said detection process, and determining an applied voltage and an applied time length which are needed for forming the polarization domain having a size within the allowable range.

The aforementioned condition determining process determines the applied voltage and the applied time length which is needed to form one size of the polarization domain which is stable and the smallest detected in the detection process. However, the condition determining process according to this aspect determines an allowable range in the size of the polarization domain on the basis of the size of the polarization domain which is stable and the smallest detected in the detection process, and determines an applied voltage and an applied time length which are needed for forming the polarization domain having a size within the allowable range. Theoretically, the size of the polarization domain which is stable and the smallest is one. However, actually, it is allowed to change the size of the polarization domain within an allowable range. The allowable range is determined, for example, on the basis of functional conditions of an information recording or reproducing apparatus. More concretely, it is determined so as to keep the limitation of record speed or record density of an information recording or reproducing apparatus. Thus, it is possible to improve degree of freedom about setting of the voltage applied time length or setting of the polarization domain size.

In another aspect of the record condition extraction method of the dielectric recording medium, it is further provided with a memory process of memorizing: the applied voltage which is set in the applied voltage setting process and which is applied, the applied time length which is set in the applied time length setting process and for which the voltage is applied; and the size of the polarization domain measured in the measurement process.

According to this aspect, the applied voltage and the applied time length obtained when forming the polarization domain and the size of the polarization domain are recorded or memorized, and they are used when extracting the optimum record condition.

In another aspect of the record condition extraction method of the dielectric recording medium, it is further provided with an output process of outputting in a predetermined format applied voltage information indicating the applied voltage which is set in the applied voltage setting process and which is applied; applied time length information indicating the applied time length which is set in the applied time length setting process and for which the applied voltage is applied; and size information indicating the size of the polarization domain measured in the measurement process.

According to this aspect, the applied voltage and the applied time length obtained when forming the polarization domain and the size of the polarization domain are outputted to the output device such as a personal computer, a printer, a monitor, and the like.

In another aspect of the record condition extraction method of the dielectric recording medium, the detection process detects whether or not the polarization domain formed in the dielectric recording medium is stable and the smallest on the basis of information memorized in the memory process.

According to this aspect, the stable and the smallest polarization domain can be obtained on the basis of the information memorized in the memory process.

In another aspect of the record condition extraction method of the dielectric recording medium, information on the polarization domain which is detected as being stable and the smallest in the detection process is outputted in the output process with information on the applied voltage which is set in the applied voltage setting process and which is applied and information on the applied time length which is set in the applied time length setting process and for which the applied voltage is applied.

According to this aspect, the information on the applied voltage and the applied time length set when forming the polarization domain is outputted to the output device, such as a personal computer, a printer, a monitor, and the like, with the information on the polarization domain which is detected as being stable and the smallest in the detection process.

The above object of the present invention can be achieved by an information recording apparatus of a dielectric recording medium for recording information by applying a voltage to the dielectric recording medium to form a polarization domain. The information recording apparatus is provided with: an applied voltage setting device for setting an optimum applied voltage of a voltage applied to the dielectric recording medium; and an applied time length setting device for setting an optimum applied time length of the voltage applied to the dielectric recording medium.

According to the information recording apparatus of the present invention, since the information recording apparatus is provided with the applied voltage setting device and the applied time length setting device, it is possible to set the optimum record condition to record, on the basis of the material characteristic and the material thickness of the dielectric recording medium and the probe radius of the apparatus.

In one aspect of the information recording apparatus of the present invention, it is provided with a record information reproducing device for reproducing the information recorded in the dielectric recording medium.

According to this aspect, since the information recording apparatus provided with the applied voltage setting device and the applied time length setting device has a reproducing function, it is possible to reproduce the information recorded in the recording medium as well as recording with the optimum record condition.

The nature, utility, and further features of this invention will be more clearly apparent from the following detailed description with reference to preferred embodiments of the invention when read in conjunction with the accompanying drawings briefly described below.

DETAILED DESCRIPTION OF THE PREFERRED EMBODIMENTS (I) First Embodiment

Figure 1:
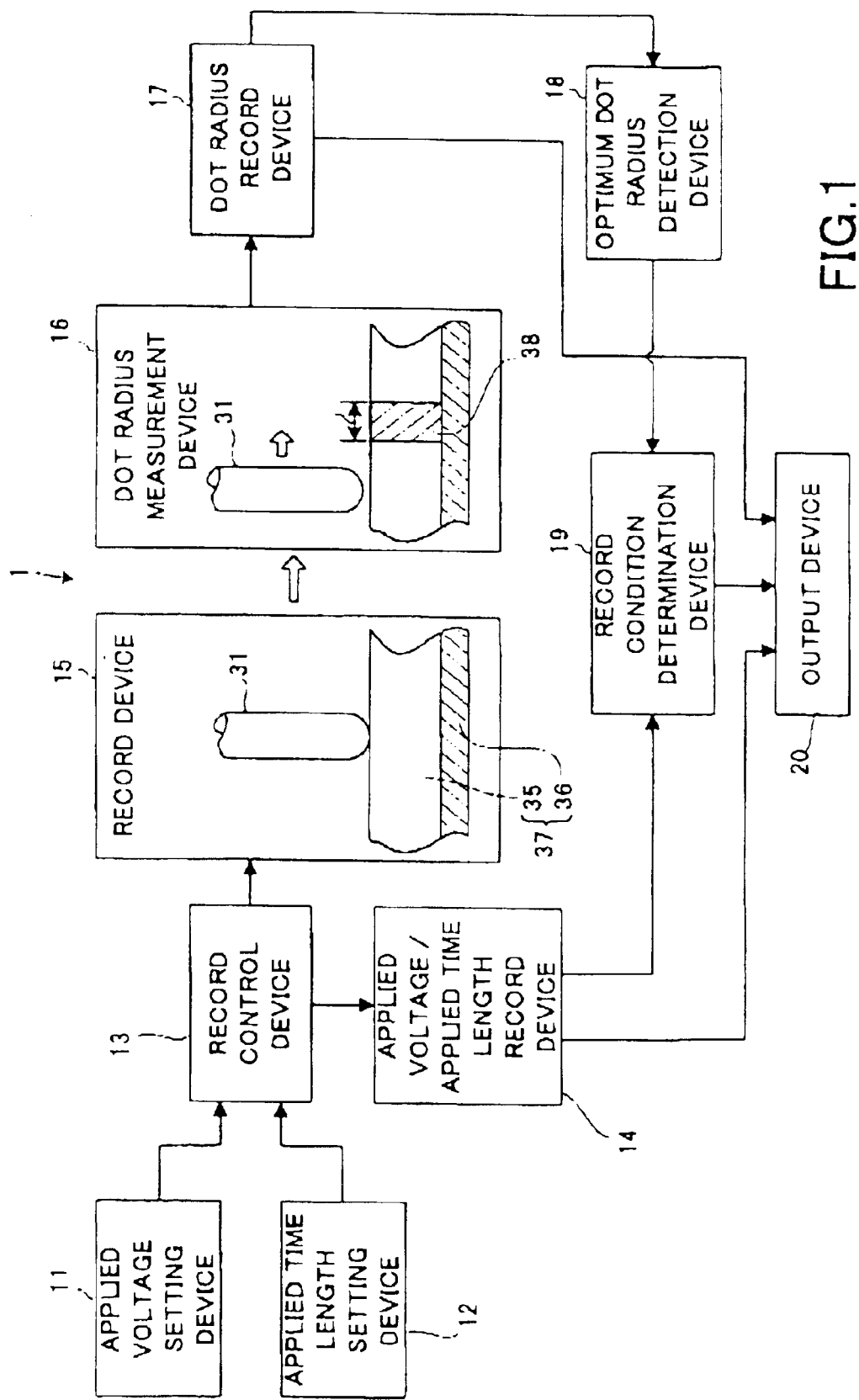
FIG. 1 is a block diagram showing a structure of a record condition extraction system for obtaining a record condition of a dielectric recording medium.
Figure 2:
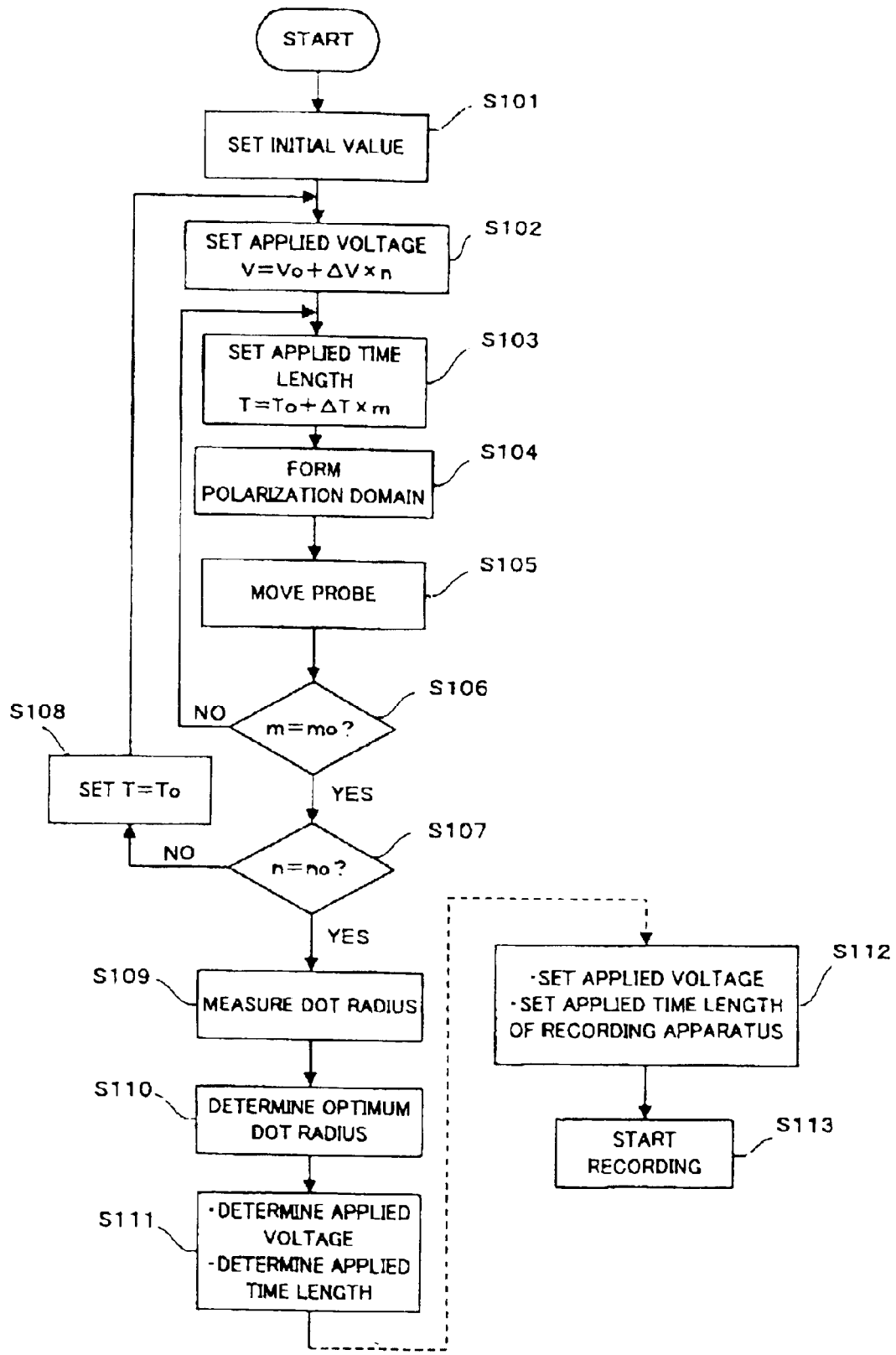
FIG. 2 is a flow chart showing operational flow of the record condition extraction system.
Figure 3A:
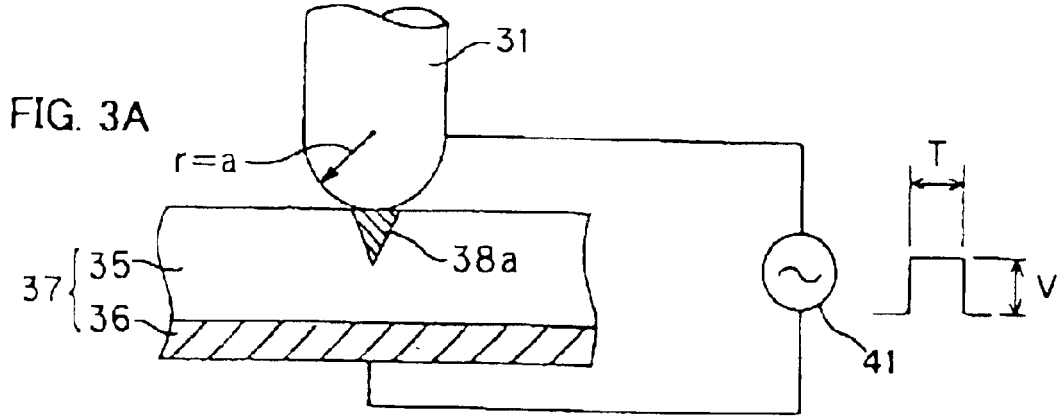
FIG. 3A to FIG. 3D are schematic diagrams showing record conditions to the dielectric recording medium, FIG. 3A showing the condition that a polarization domain is formed on the end of a probe, FIG. 3B showing the condition that the polarization domain further grows, FIG. 3C showing the condition that the polarization domain reaches the back surface of the recording medium and the polarization domain is completely formed, and FIG. 3D showing a strength distribution of an electric field in the recording medium by the probe.
Figure 3B:
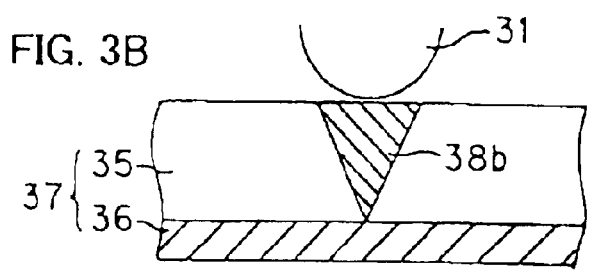
Figure 3C:
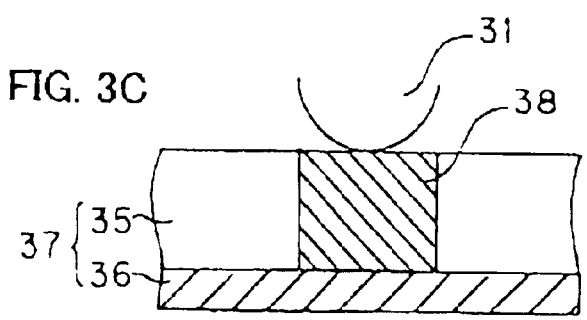
Figure 3D:
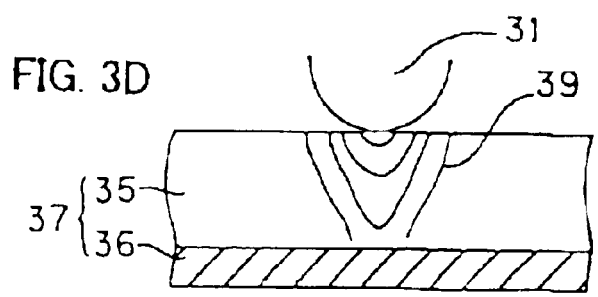
Figure 4:
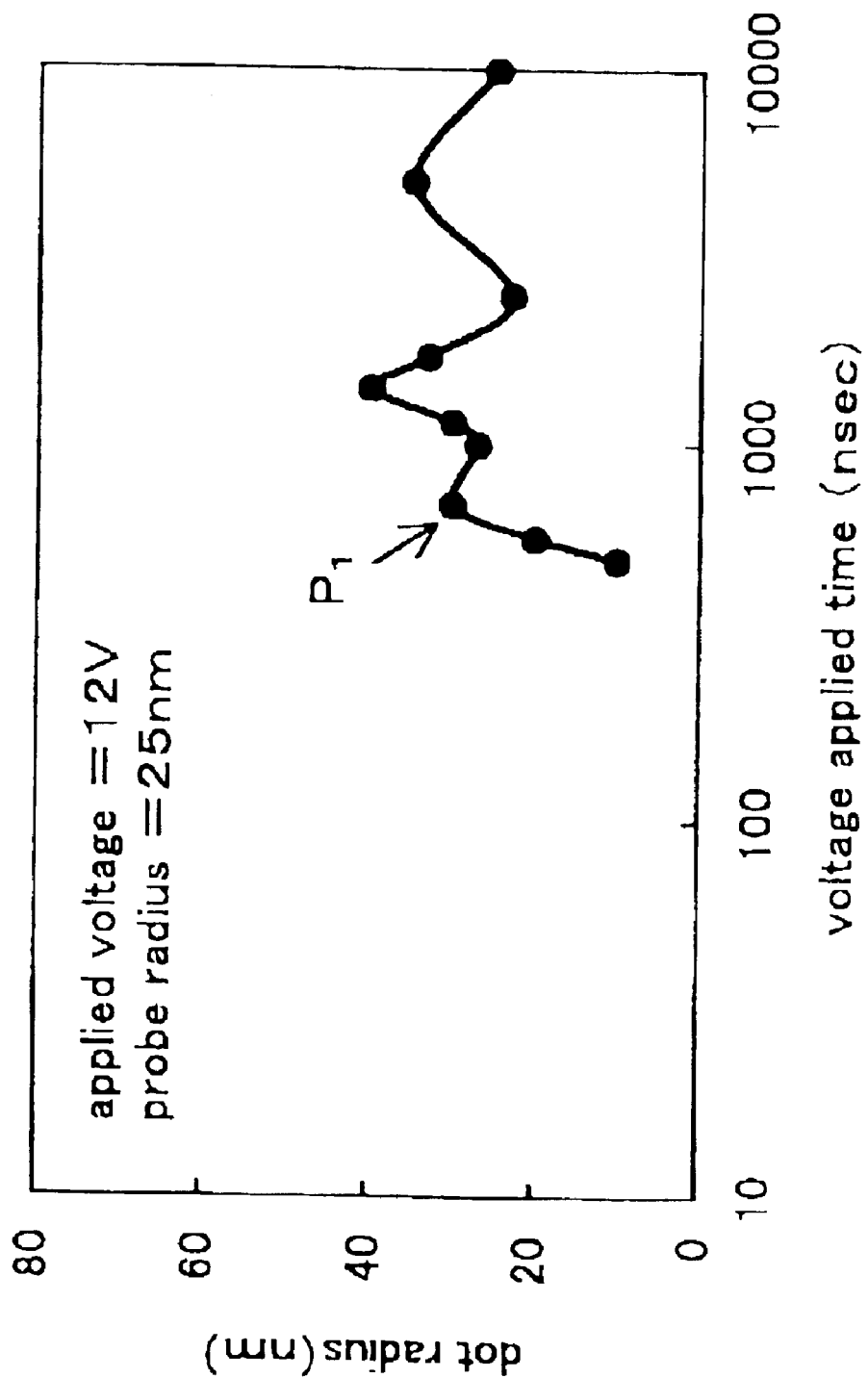
FIG. 4 is a measurement diagram showing a relationship between voltage applied time length and a dot radius at the applied voltage of 12 V and with the probe radius of 25 nm.
Figure 5:
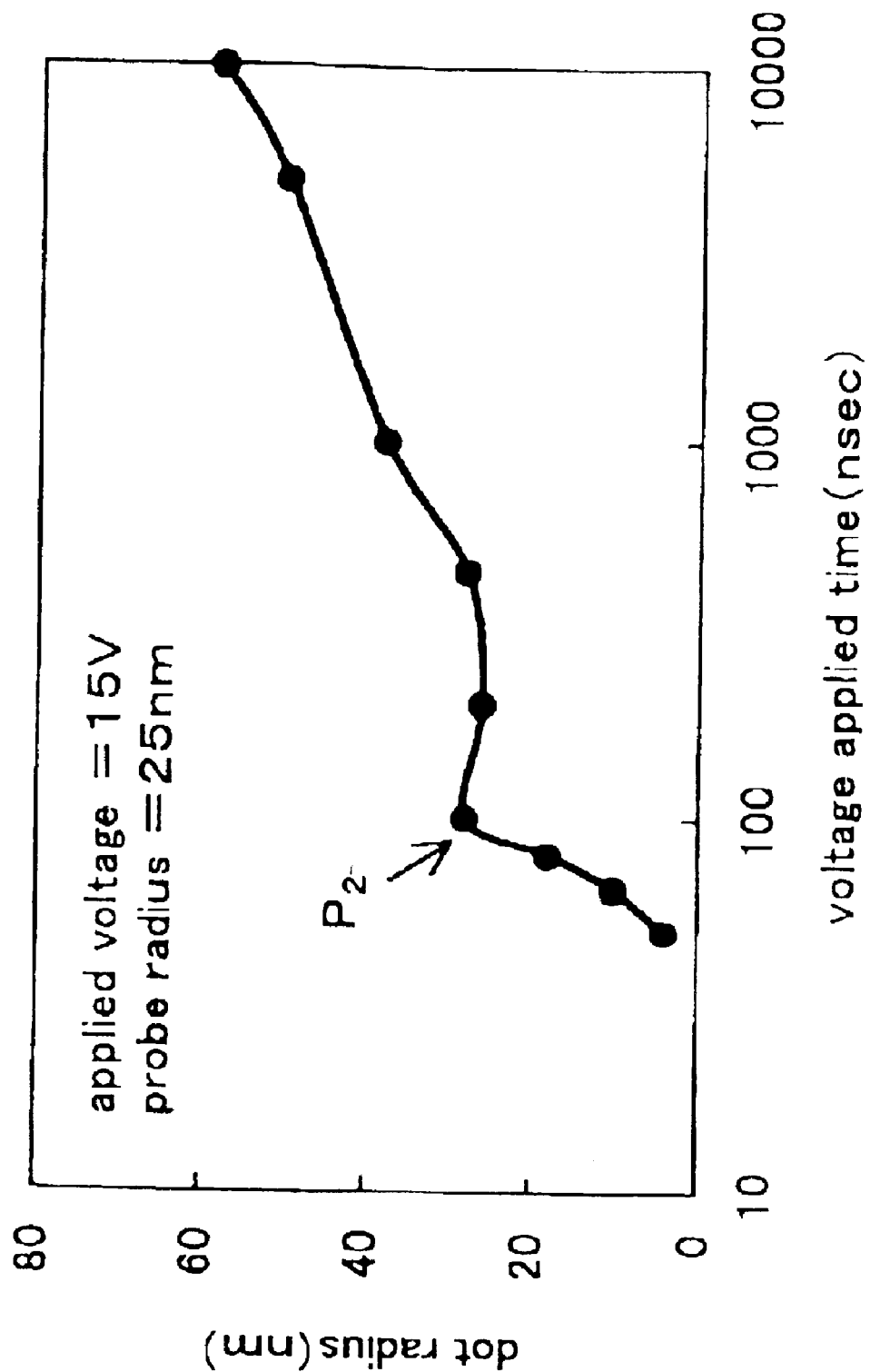
FIG. 5 is a measurement diagram showing a relationship between voltage applied time length and a dot radius at the applied voltage of 15 V and with the probe radius of 25 nm.
Figure 6:
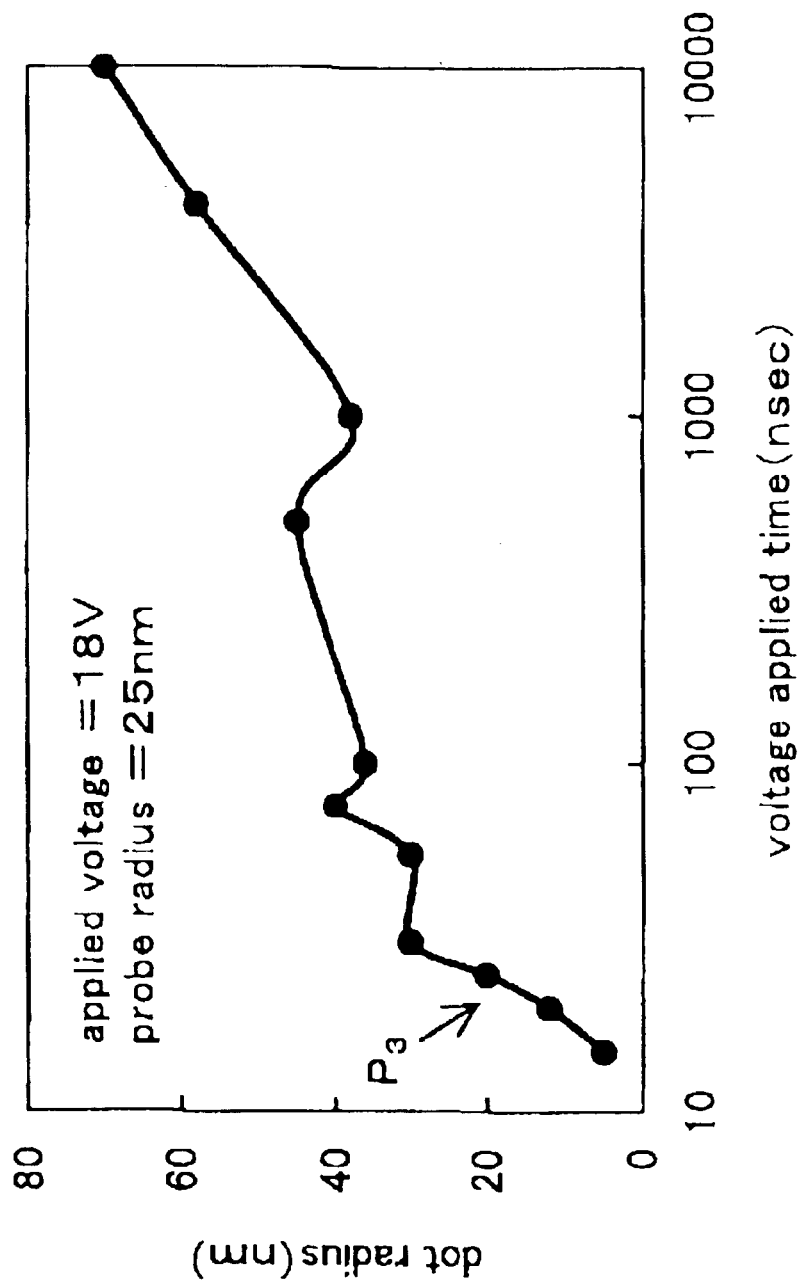
FIG. 6 is a measurement diagram showing a relationship between voltage applied time length and a dot radius at the applied voltage of 18 V and with the probe radius of 25 nm.
Figure 7:
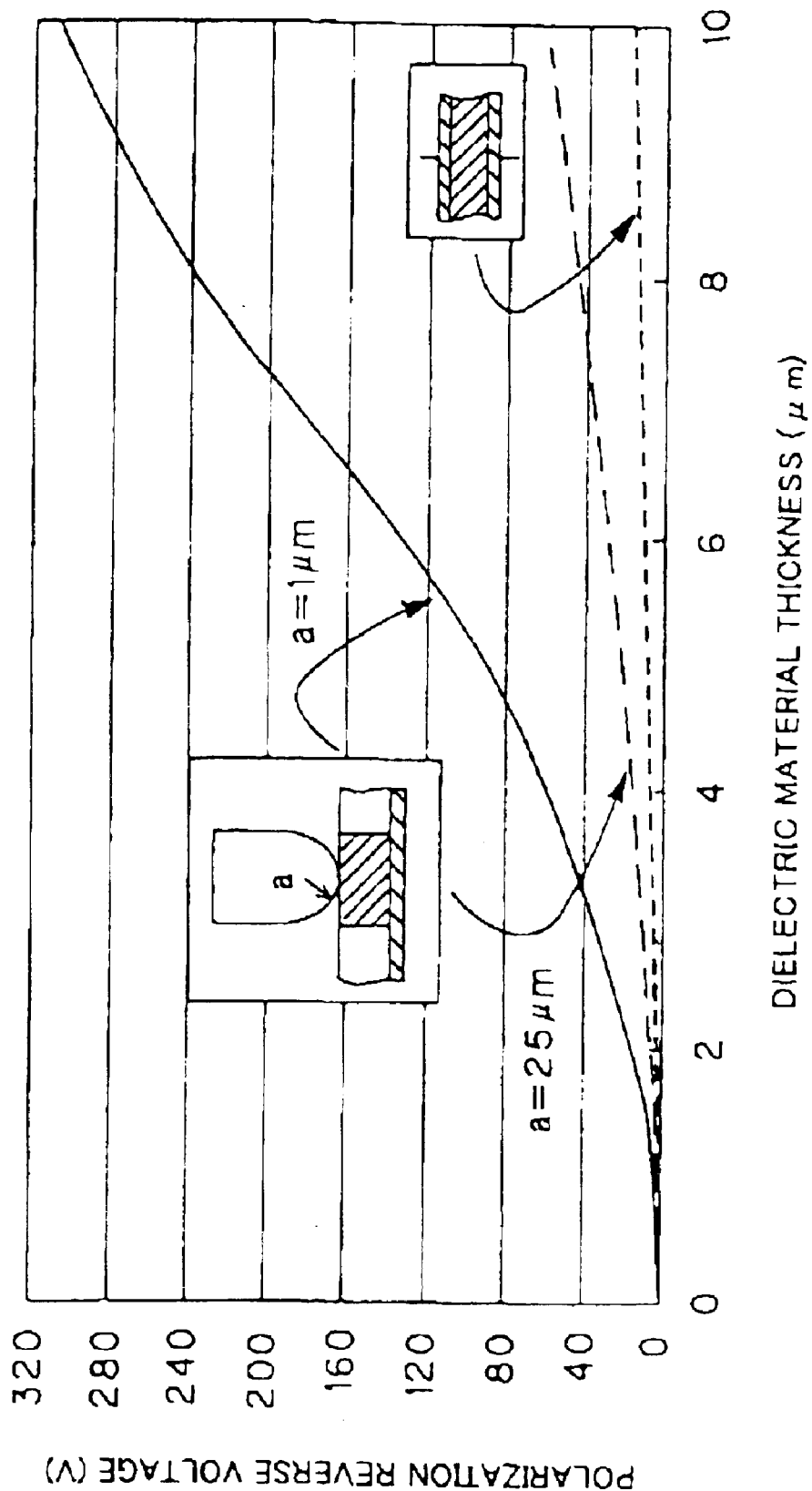
FIG. 7 is a schematic diagram showing a relationship between a thickness of the dielectric substance and a minimum voltage, which reverses the polarization domain, with a probe shape as a parameter.

The record condition extraction system and method of the dielectric recording medium of the present invention will be explained with reference to FIG. 1 to FIG. 7. FIG. 1 is a block diagram showing a structure of a record condition extraction system for obtaining a record condition of a dielectric recording medium. FIG. 2 is a flow chart showing operational flow of the record condition extraction system. FIG. 3A to FIG. 3D are schematic diagrams showing record conditions to the dielectric recording medium, FIG. 3A showing the condition that a polarization domain is formed on the end of a probe, FIG. 3B showing the condition that the polarization domain further grows, FIG. 3C showing the condition that the polarization domain reaches the back surface of the recording medium and the polarization domain is completely formed, and FIG. 3D showing a strength distribution of an electric field in the recording medium by the probe. FIG. 4 to FIG. 6 are measurement diagrams showing a relationship between voltage applied time length and a dot radius. FIG. 7 is a schematic diagram showing a relationship between a thickness of the dielectric substance and a minimum voltage, which reverses the polarization domain, with a probe shape as a parameter.

The record condition extraction system of the present invention is intended to obtain a condition to be recorded when recording information in the dielectric recording medium. Concretely, the record condition extraction system obtains voltage applied between an electrode placed on the back surface of the dielectric recording medium and a probe abutting on a recording surface of the dielectric recording medium, and further obtains the time length that the voltage is applied to the dielectric recording medium, i.e. a pulse width. By applying the voltage to the dielectric recording medium on the basis of the extracted condition, the polarization domain at this time is formed as a dot of the smallest radius which maintains a, stable condition. This dot corresponds to one unit of the recording information, and its recording time is short. Moreover, it enables a record condition with high recording density to be set. Incidentally, the material and the thickness of the dielectric recording medium, the probe radius, and the like affect the optimum applied voltage and the optimum applied time length.

As shown in the block diagram in FIG. 1, a record condition extraction system 1 of the dielectric recording medium related to the present invention is provided with: an applied voltage setting device 11; an applied time length setting device 12; a record control device 13; an applied voltage/applied time length record device 14; a record device 15; a dot radius measurement device 16; a dot radius record device 17; an optimum dot radius detection device 18; a record condition determination device 19; and an output device 20.

A dielectric recording medium 37 is equipped with a dielectric substance 35 and an electrode 36 on its one surface. When a voltage is applied to a probe 31 abutting on the other surface, a polarization domain is formed depending on an electric field produced between the probe 31 and the electrode 36, and then information is recorded. In this case, initializing the polarization domain of the dielectric substance 35 in advance to a + surface or a − surface and applying to the probe 31 a voltage that will reverse this polarization make it possible to obtain better S/N ratios of data.

The applied voltage setting device 11 sets the voltage applied to the probe 31 of the record device 15. As the form of setting the applied voltage, for example, the applied voltage setting device 11 is provided with; a device for inputting an initial applied voltage $V_0$, a step voltage $\Delta V$, which is stepwise applied, and the number $n_0$ of applying, and a device for operating an applied voltage $V=V_0+\Delta V \times n$ ($n \leq n_0$), and the applied voltage V is automatically calculated depending on the number of applying. Moreover, it is not limited to this, but it is also possible to set an arbitrary voltage manually whenever applying the voltage.

The applied time length setting device 12 sets the applied time length of the voltage applied to the probe 31 of the record device 15. As the form of setting the applied time length, for example, the applied time length setting device 12 is provided with: a device for inputting an initial applied time length $T_0$, a step time length $\Delta T$, which is stepwise applied, and the number $m_0$ of applying; and a device for operating an applied time length $T=T_0+\Delta T\times m$ ($m \leq m_0$), and the applied time length T is automatically calculated depending on the number of applying. Moreover, it is not limited to this, but it is also possible to set an arbitrary applied time length manually whenever applying.

The record control device 13 controls the record device 15 to form the polarization domain, on the basis of the applied voltage V set at the applied voltage setting device 11 and the applied time length T set at the applied time length setting device 12. Moreover, The record control device 13 records the data of the applied voltage V and the applied time length T at the applied voltage/applied time length record device 14 in the form able to correspond to the formed polarization domain whenever forming the polarization domain. Incidentally, the initial applied voltage $V_0$ and initial applied time length $T_0$ are set as the smallest voltage and pulse width, which can form the polarization domain on the basis of the coercive electric field of the dielectric material 35 and in opposition to this.

The applied voltage/applied time length record device 14 records the applied voltage V and the applied time length T applied when forming the polarization domain, in the form able to correspond to the formed polarization domain. If the optimum polarization domain for recording is obtained from among the polarization domains formed by the combinations of various applied voltages V and various applied time lengths T, the combination of the applied voltage V and the applied time length T, which have formed the optimum polarization domain, can be determined.

The record device 15 is intended to form the polarization domain with respect to a dielectric recording medium 37 on the basis of the record condition from the record control device 13. The voltage is applied by the probe 31 to the dielectric substance 35 of the dielectric recording medium 37 to form the dot. The record condition is the applied voltage V and the applied time length T, and their values are sequentially changed by the applied voltage setting device 11 and the applied time length setting device 12. Whenever the probe 31 and the dielectric recording medium 37 form the dot, their relative position is moved by a not-illustrated moving mechanism, and they form another dot by a next voltage application condition in a new recording domain.

The dot radius measurement device 16 measures the size of the dot by a polarization domain formed at the record device 15. As means for measuring, there are used the method of measuring by chemical-etching the recording surface of a recording medium and detecting the difference of an etching rate, the method of measuring by applying a high frequency voltage to a dielectric material by an AFM apparatus and detecting piezoelectric response, and the SNDM method proposed by the inventors of the present invention. The dot radius measurement device 16 shown in FIG. 1 scans on the dielectric substance 35 with the probe 31 in the direction shown with an alphabet L, and more specifically, it measures the dot radius by an electric device, which will be explained in the third embodiment.

The dot radius record device 17 sequentially records the dot radius of a polarization domain 38 measured at the dot radius measurement device 16. The dot is recorded in the form able to correspond to information on the applied voltage V and the applied time length T forming the dot. For example, the recording in the order corresponding to the forming order can correspond to the order of the applied voltage V and the applied time length T recorded at the applied voltage/applied time length record device 14.

The optimum dot detection device 18 detects the stable and the smallest dot from the data recorded in the dot record device 17. As a method of detecting, it is conceivable of calculating by using a statistical approach from the relationship of the dot radius to the applied time length T or determining from the measurement diagrams of the dot radius to the applied time length T, as shown in FIG. 4 to FIG. 6, which will be explained later.

The record condition determination device 19 determines the applied voltage V and the applied time length T to form the stable and the smallest dot from the optimum dot detected at the optimum dot detection device 18 and from the applied voltage V and the applied time length T which are recorded at the applied voltage/applied time length record device 14 and which are set and applied for the formation of the optimum dot. This optimum applied voltage V and applied time length T are not limited to actual set values, but are obtained as their intermediate values by a statistical operation in some cases.

The output device 20 outputs after correlating the data recorded in the applied voltage/applied time length record device 14 with the data recorded in the dot radius record device 17, and it also outputs the applied voltage V, the applied time length T, and the like obtained to form the stable and the smallest dot. As the output apparatus, there are a personal computer, a printer, a monitor, and the like. Moreover, it is possible to estimate and obtain the optimum record condition from the output indicating the relationship among the dot radius, the applied voltage V, and the applied time length T.

As explained above, according to the record condition extraction system of the dielectric recording medium of the present invention, it is possible to obtain the set condition of the applied voltage and the applied time length forming the small and the smallest polarization domain in response to the material and the thickness of the dielectric substance, and the probe radius. Therefore, by setting the condition of the applied voltage and the applied time length obtained to an information recording apparatus having the material and the thickness of the same dielectric substance, and the same probe radius, it becomes possible to record information at high speed and with high density.

Next, the operational flow of the record condition extraction system 1 will be explained. As shown in FIG. 2, initial values are firstly set, such as the initial applied voltage $V_0$ applying between the probe 31 and the electrode 36, the step voltage $\Delta V$, the initial applied time length $T_0$, the step time length $\Delta T$, the number $n_0$ of setting the applied voltage, and the number $m_0$ of setting the applied time length (step S101). These initial applied voltage $V_0$ and initial applied time length $T_0$ are respectively set as the smallest voltage and pulse width, which can form the polarization domain in opposition to the coercive electric field obtained of the dielectric material 35. The applied time length corresponds to the pulse width of the applied voltage.

Secondly, the applied voltage $V=V_0+\Delta V\times n$ is set (step S102). n is the number of setting, and if n=0 is a start, a first applied voltage becomes the voltage $V_0$ set initially. Then, the applied time length $T=T_0+\Delta T\times m$ is set (step S103). m is the number of setting, and if m=0 is a start, a first applied time length becomes the time $T_0$ set initially.

After the applied voltage V and the applied time length T are set, the voltage to have set is applied to the electrode 31 for the time to have set, and the polarization domain is formed in the dielectric recording medium 37 (step S104).

This formation of the polarization domain causes the dot of the polarization domain to be formed in the size corresponding to the applied voltage V and the applied time length T. After step S104, the probe 31 moves a predetermined position of applying a next voltage on the dielectric recording medium (step S105).

Next, it is judged whether or not the number of applying reaches the number $m_0$ set initially (step S106). If not reaching, the operational flow returns to step S103, and the formation of the polarization domain is repeated with the next applied time length set.

If the number of applying reaches the number $m_0$ set initially, then it is judged whether or not the number of applying the voltage reaches the number no set initially (step S107). If not reaching, after the applied time length T is set $T_0$ (step S108), the operational flow returns to step S102, and the formation of the polarization domain is repeated with the next applied voltage set.

Incidentally, it is assumed that the execution number m of setting the applied voltage and the execution number n of setting the applied time length are counted on a predetermined route during an operation routine. The setting order of the applied voltage can be replaced with that of the applied time length.

After the execution number m of setting the applied voltage and the execution number n of setting the applied time length exceed the numbers $m_0$ and $n_0$ set initially, thereby completing the record operation, the dot radius of the formed polarization domain is measured (step S109). As the measurement of the dot radius, there are used the method of measuring by chemical-etching the recording surface of a recording medium and detecting the difference of an etching rate, the method of measuring by applying a high frequency voltage to a dielectric material by an AFM apparatus and detecting piezoelectric response, or the SNDM method.

Then, the optimum dot radius for the record operation is chosen from a distribution condition of the formed dot radius. The dot which is stable and whose dot radius is the smallest will be chosen and decided, which will be explained in detail later with reference to FIG. 4 to FIG. 6 (step S110).

Then, the applied voltage V and the applied time length T at the time of forming the optimum dot for recording are read out from the applied voltage/applied time length record device 14, and the applied voltage V and the applied time length T of the optimum dot formation for the characteristics and the thickness of the dielectric material, and the probe radius which are used at that time are determined (step S111).

As described above, the applied voltage V and the applied time length T of the optimum dot formation for the characteristics and the thickness of the dielectric material, and the probe radius are extracted. If they are applied for the recording apparatus, the extracted applied voltage V and the extracted applied time length T are set (step S112) with respect to the recording apparatus having the same radius probe as that of the dielectric material at the time of extracting, and information is started to record (step S113).

The operational flow of the record condition extraction apparatus explained above is not limited to this. For example, it is also conceivable of taking a method of measuring the dot radius whenever the dot is formed, and the like. If the dot which is stable under many conditions of the applied voltage V and the applied time length T and whose radius is the smallest can be chosen, any operation forms will do.

The stable polarization domain is formed in the process shown in FIG. 3A to FIG. 3C. FIG. 3A shows the condition that recording signals of the applied voltage V and the applied time length T from a recording signal source 41 are applied to the dielectric recording medium 37 provided with the dielectric substance 35 and the electrode 36 by the probe 31 having a hemispherical end portion whose radius is a. It shows the condition that a polarization domain 38a is formed only on the end portion of the probe 31 and that the applied voltage V and the applied time length T are not sufficient. The dot in this condition is unstable, and it disappears.

FIG. 3B shows that the tip of a polarization domain 38b reaches the back surface of the dielectric substance 35, and even in this condition, the stability as information recording is not sufficient.

FIG. 3C shows the condition that a polarization domain 38 completely reaches the back surface of the dielectric substance 35 thereby to form the dot having the substantially same radius as that of the probe 31 and that the domain is completely polarized. This condition is stable, and it is held without disappearing as information. This polarization domain 38 having the smallest radius is obtained by the applied voltage V and the applied time length T, which are determined by the above described record condition extraction, being applied. Incidentally, FIG. 3D shows a strength distribution of an electric field in the dielectric substance 35 by the probe 31, and the polarization proceeds along this electric field.

Examples of measuring the applied voltage, the applied time length, and the dot radius and the detection of the optimum dot radius will be explained with reference to FIG. 4 to FIG. 6. These figures may be assumed to be outputted by a printer of the output device 20 in FIG. 1, for example.

FIG. 4 is the case of the applied voltage 12 V and the probe radius 25 nm. FIG. 4 shows that the dot radius rapidly decreases at shorter time than a point P1 around the voltage applied time length 1000 nsec. The shorter time than this time corresponds to the conditions in FIG. 3B and FIG. 3A, and the formed dot is unstable and inappropriate for information recording. The point P1 and longer time correspond to the condition in FIG. 3C, and the dot having the substantially same radius as the probe radius is formed. The applied time length which is the shortest among them, i.e. the pulse width is small and a recording speed is fast, is employed as a condition.

FIG. 5 is the case of the applied voltage 15 V and the probe radius 25 nm. FIG. 5 shows that the dot radius rapidly decreases at shorter time than a point P2 around the voltage applied time length 100 nsec. At the shorter time than this time, the dot formed in the same manner as the above mentioned is unstable and inappropriate for information recording, while the dot having the substantially same radius as the probe radius is formed at the point P2. Incidentally, as the voltage applied time length increases to 10000 nsec, the dot radius increases, but it is not preferable because this decreases the recording density and because this is the domain decreasing the recording speed.

FIG. 6 is the case of the applied voltage 18 V and the probe radius 25 nm. FIG. 6 shows that the dot radius rapidly decreases at shorter time than a point P3 around the voltage applied time length 20 nsec. At the shorter time than this time, the dot formed in the same manner as the above mentioned is unstable and inappropriate for information recording, while the dot having the substantially same radius as the probe radius is formed at the point P3. Incidentally, as the voltage applied time length increases to 10000 nsec, the dot radius increases, but it is not preferable because this also decreases the recording density and the recording speed.

As the optimum applied time length is determined with respect to each applied voltage and the applied voltage is higher, the applied time length is shorter, i.e. the recording speed becomes higher. However, the applied voltage depends on a power environment of the information recording apparatus, and it is necessary to consider about discharge depending on the thickness of the dielectric substance and the dielectric constant between the probe and the electrode, so that it is necessary to determine the optimum applied voltage and the optimum applied time length as occasion demands.

FIG. 7 is a schematic diagram showing a relationship between a thickness of the dielectric substance and a minimum voltage, which reverses the polarization domain, with a probe shape as a parameter. Our research shows that there is a similarity among the probe shape, the thickness of the dielectric recording medium, domain size, reverse voltage in the polarization domain, and the like. Therefore, even if the probe radius is 25 nm and the thickness of the dielectric substance is 2000 Å in FIG. 7, things are the same, and it indicates that the small polarization domain is obtained corresponding to the small probe radius.

(II) Second Embodiment

Figure 8:
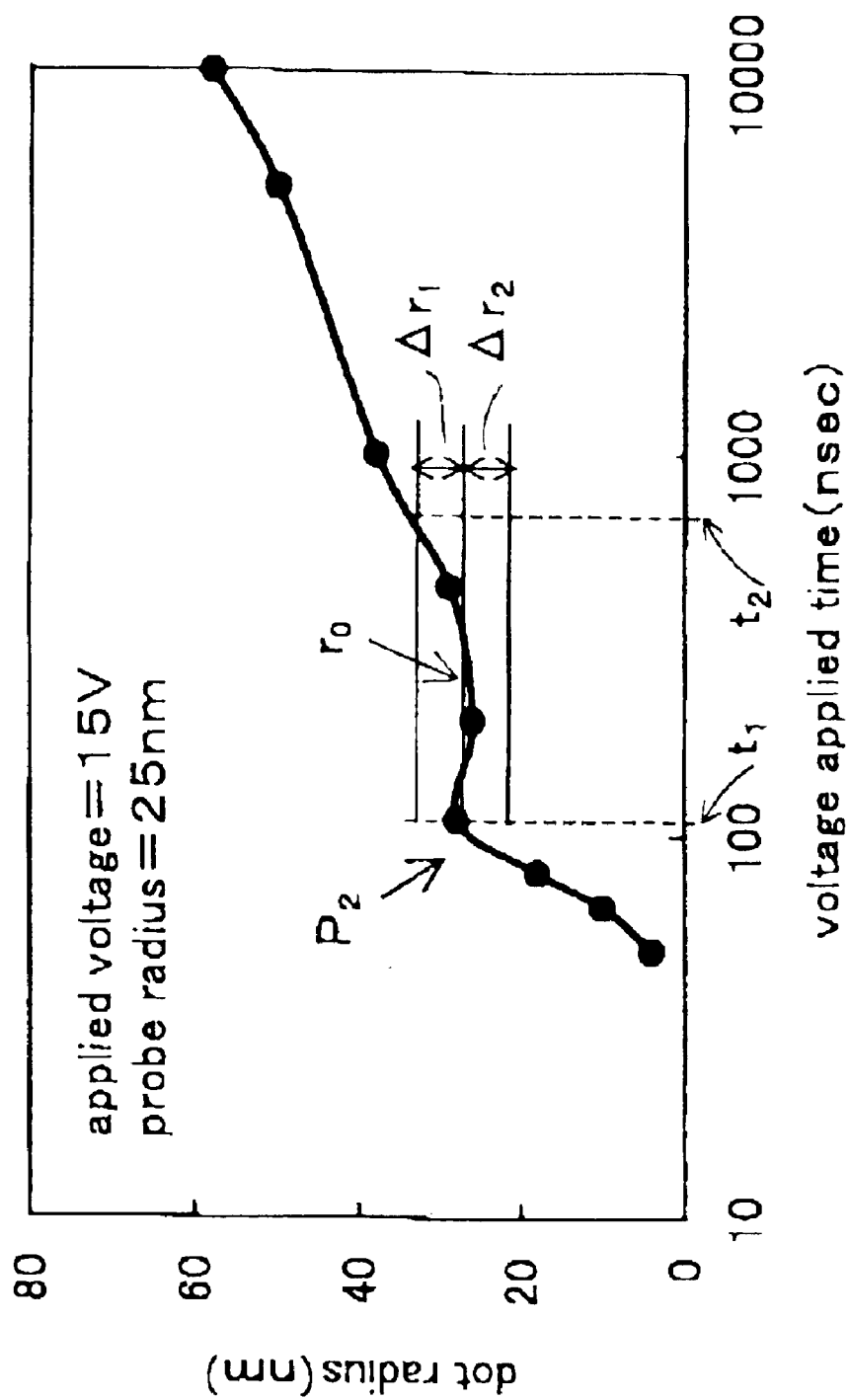
FIG. 8 is a diagram showing the relationship between a dot radius and a voltage applied time length when certain allowable values are set with respect to an optimum dot radius.
Figure 9:
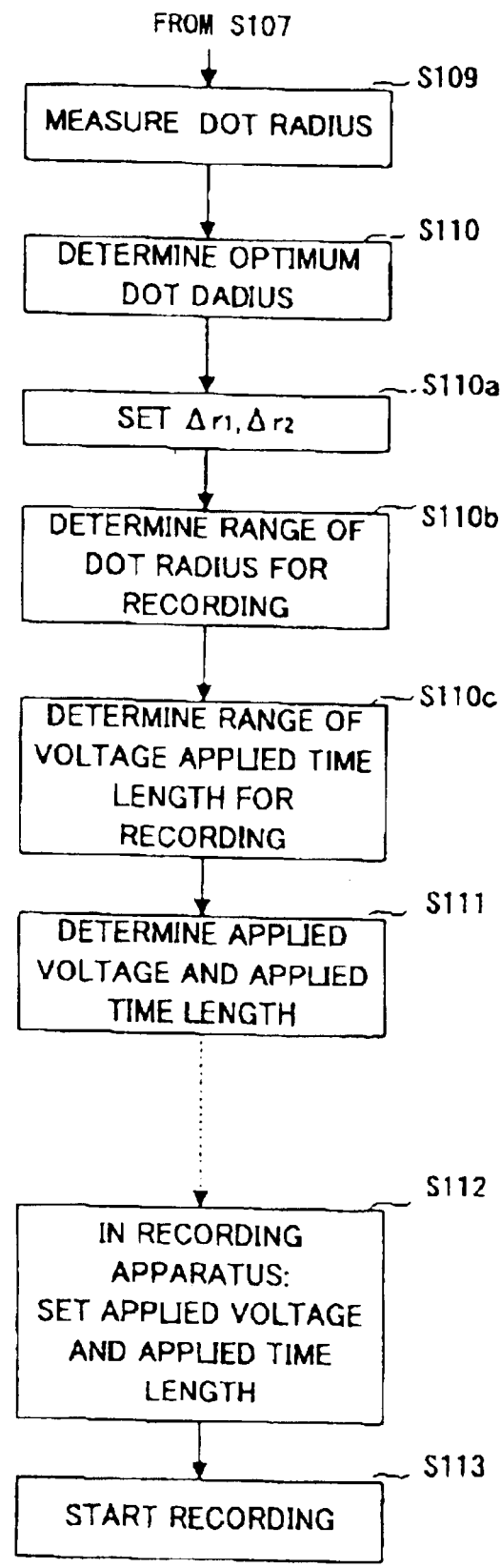
FIG. 9 is a flowchart showing the operational flow of a record condition extraction system when certain allowable values are set with respect to an optimum dot radius.

Next, an allowable range of the dot radius on the basis of the smallest and stable polarization domain and the voltage applied time length will be explained with FIG. 8 and FIG. 9. This is useful to determine the size of the polarization domain which is more stable and to obtain degree of freedom for setting the applied time length while keeping the limitation of the recording speed or the recording density Incidentally, FIG. 8 is a diagram showing the relationship between the dot radius and the voltage applied time length when certain allowable values are set with respect to the optimum dot radius shown in FIG. 5, for example. FIG. 9 is a flowchart showing the operational flow of the record condition extraction system shown in FIG. 2 when the allowable values are set with respect to the optimum dot radius.

As shown in FIG. 8, on the dot radius of the polarization domain, allowable range $\Delta r_1$ in the plus direction and allowable range $\Delta r_2$ in the minus direction are set on the basis of radius $r_0$ of point $P_2$ at which the stable and smallest dot radius can be obtained. $\Delta r_1$ and $\Delta r_2$ are limited by the recording density of an information recording apparatus. In order to obtain the more stable and larger polarization domain, it is important to set $\Delta r_1$. Assuming that the voltage applied time length corresponding to the point where the value of radius $\Delta r_0 + \Delta r_1$ and the measured dot curve intersect each other is $t_2$, it is permissible to selectively set the voltage applied time length between the voltage applied time length $t_1$ corresponding to the point $P_2$ and the voltage applied time length $t_2$. Therefore, it is possible to arbitrarily set the voltage applied time length while keeping the limitation of the recording speed of an information recording apparatus.

As shown in FIG. 9, the operational flow of the record condition extraction system can be achieved by inserting steps 110a, 110b and 110c between steps 100 and 111 in the operational flow shown in FIG. 2. At step 110a, $\Delta r_1$ and $\Delta r_2$ shown in FIG. 8 are set. At step 110b, the dot radius range for recording is determined. At step 110c, the range of the voltage applied time length for recording is set. In the initial state, the ranges $\Delta r_1$ and $\Delta r_2$ are determined and input depending upon the limitation of the record density in advance. On the basis of these conditions, the concrete applied voltage and applied time length are determined at step 111. The other steps are the same as those in FIG. 2, and the explanation is omitted.

(III) Third Embodiment

Next, the information recording apparatus provided with setting devices for setting the applied voltage and the applied time length extracted the record condition extraction system of the dielectric recording medium of the present invention will be explained.

Figure 10:
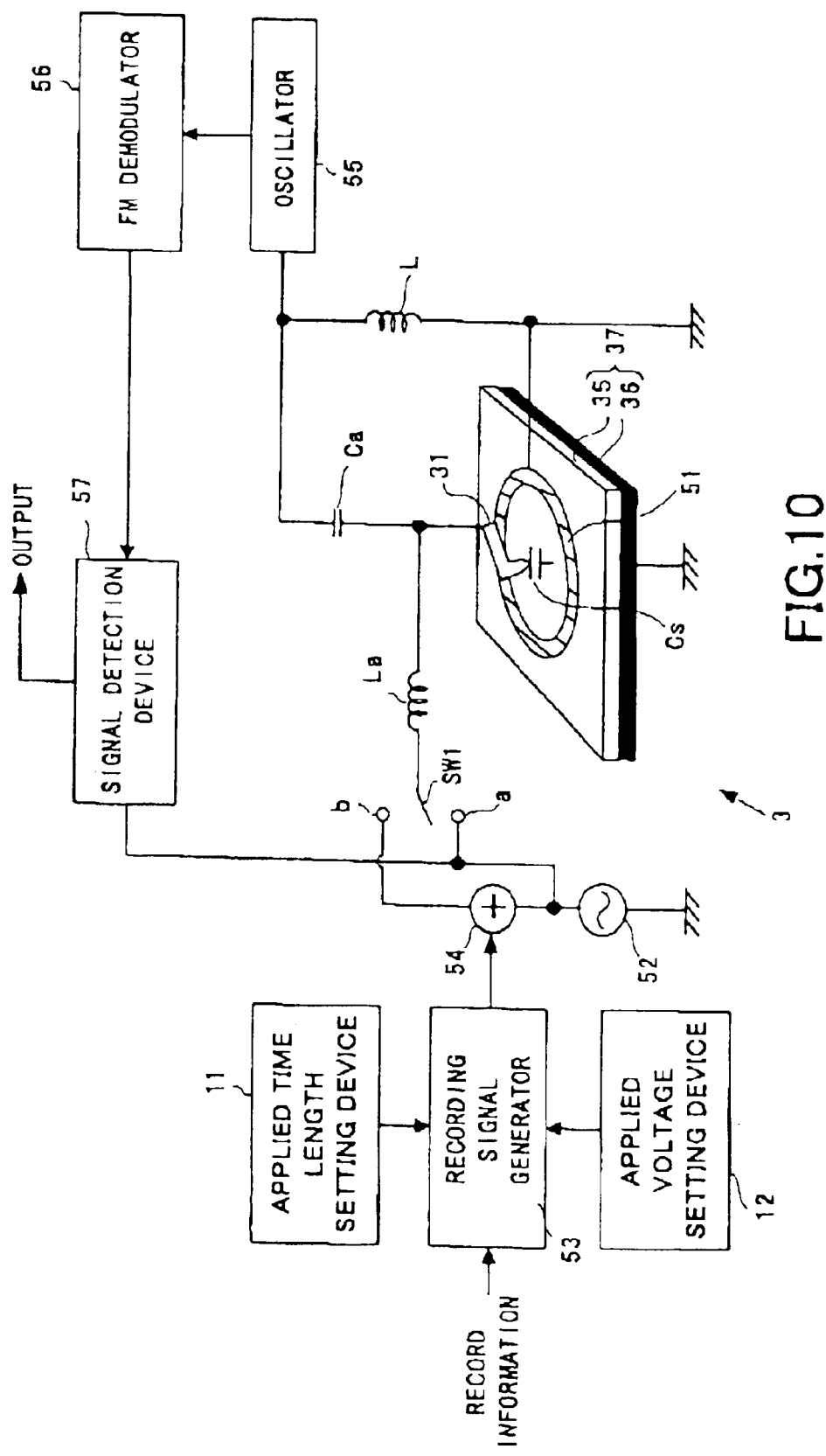
FIG. 10 is a schematic diagram showing one example of an information recording apparatus which uses the dielectric recording medium and in which the record condition is set by an extraction method of the present invention.

As shown in FIG. 10, an information recording apparatus 3 is provided with: the dielectric recording medium 37 equipped with the dielectric substance 35 and the electrode 36; the probe 31; an electrode 51; an AC (Alternating Current) signal generator 52; a recording signal generator 53; an applied voltage setting device 11; an applied time length setting device 12; an adder 54; an oscillator 55; a FM (Frequency Modulation) demodulator 56; a signal detection device 57; an inductor L; an inductor La; and a capacitance Ca. Obviously, it is provided with other various general functions as the information recording apparatus; however, their explanation is omitted.

The dielectric recording medium 37 is a medium for recording information, and its shape can be various, such as a disk form, a tape form, a card form, and the like. Moreover, it may be divided into a plurality of domains to provide record areas. As the dielectric substance 35, a thin film of the dielectric material such as lithium tantalate or the like. The electrode 36 is an electrode of receiving the electric field applied to the dielectric substance 35.

The probe 31 is a hemispherical member having a predetermined radius at the end, and at least its surface has conductivity. In recording information, the voltage is applied to this probe to form the polarization domain in the dielectric substance 35. On the other hand, in reproducing, the polarization domain is traced by the probe 31 to pickup the recorded information.

The electrode 36 is intended to conduct to an earth the high frequency electric field applied in the microdomain of the dielectric substance 35 when a high frequency signal oscillated at the oscillator 55 is added to the probe 31.

The AC signal generator 52 is a device for generating an AC signal applied to the probe 31, and it is intended to surely separate a reading signal by applying an alternating electric field to the microdomain of the dielectric substance 35 and modulating the reading signal when reading information. Moreover, it biases the recording signal from the recording signal generator 53, applies to the probe 31, and records information. The difference of the capacitance Cs corresponding to the polarization state causes oscillation frequency to be modulated, and demodulating this enables monitoring whether accurate record operation is performed. When recording information, the SW 1 is connected to a terminal a, and when writing information, the SW 1 is connected to a terminal b.

The applied voltage setting device 11 is a device for setting the applied voltage, which is a signal for applying the dielectric substance 35 as explained in the first embodiment, and the applied voltage is set to form the polarization domain capable to record with the highest density with respect to the dielectric substance 35. The optimum applied voltage is determined according to the explanation in the first embodiment.

The applied time length setting device 12 is a device for setting the applied time length of the applied voltage, which is a signal for applying the dielectric substance 35 as explained in the first embodiment, as is the case of the applied voltage setting device 11, and the applied time length is set to form the polarization domain capable to record with the highest density with respect to the dielectric substance 35 or the applied time length is set to form the polarization domain having the size within the range determined in accordance with the limitation of the recording speed or the recording density of dielectric information recording apparatus 3. The optimum applied time length is determined according to the explanation in the first embodiment.

The recording signal generator 53 converts information to be recorded in the dielectric recording medium 37 to a signal with an appropriate form for recording. A voltage level, a pulse width, and the like are converted according to the condition set at the applied voltage setting device 11 and the applied time length setting device 12.

The adder 54 adds the signal for recording from the recording signal generator 53 to the AC signal from the AC signal generator 52 to modulate and apply to the probe 31.

The oscillator 55 generates a signal to modulate the frequency of the recorded information and pickup. The oscillation frequency is set at about 1 GHz, for example.

The inductor La and the capacitance Ca constitute a low cut filter installed to prevent the AC signal of the AC signal generator 52 from interfering with the oscillator 55. The oscillation frequency of the oscillator 55 is about 1 GHz, and even if the AC signal of the AC signal generator 52 is on the order of MHz, a primary LC filter can substantially separate it. Moreover, increasing the frequency is advantageous in view of data transmission rate, and in that case, a filter constant appropriate for it may be chosen.

The inductor L constitutes a resonance circuit with the capacitance Cs corresponding to the polarization domain under the probe 31. The change of the capacitance Cs changes the resonance frequency and causes the oscillation signal of the oscillator 55 to be frequency-modulated. By demodulating this frequency modulation, the recorded information can be read out. Although the capacitance Ca is in the resonance circuit, the capacitance Cs is extremely small, compared to the capacitance Ca, so that the capacitance Cs is mainly a dominant factor with respect to the oscillation frequency, and the effect of the conductive Ca can be neglected.

The FM modulator 56 demodulates the oscillation signal of the oscillator 55 frequency-modulated by the resonance circuit formed by the inductor L and the capacitance Cs. A typical FM detection device is used for this.

The signal detection device 57 synchronously detects the signal demodulated at the FM demodulator 56 by using the AC signal of the AC signal generator 52 as a synchronous signal, thereby reproducing the recorded information.

Next, the record operation of the information recording apparatus 3 will be explained. The SW 1 is connected to the terminal b. Firstly, the information to be recorded is inputted in the recording signal generator 53. Moreover, the level of the applied voltage is set at the applied voltage setting device 11, and the applied time length of the applied voltage is set at the applied time length setting device 12. They are inputted to the recording signal generator 53. At the recording signal generator 53, the information to be recorded is converted in a predetermined format appropriate for recording, and it is outputted as the applied voltage level and the applied time length to have set, i.e. a digital recording signal of the pulse width Incidentally, setting the applied voltage level and the applied time length, i.e. the pulse width, is performed by using the method explained in the first embodiment.

The recording signal from the recording signal generator 53 is applied to the probe 31 through the inductor La, and the polarization domain is formed on a predetermined portion of the dielectric substance 35 by the electric field generated between the probe 31 and the electrode 36, and thus information is recorded. Then, the probe 31 or the dielectric recording medium 37 is relatively moved by a non-illustrated mechanism, and then information is recorded.

A record monitor modulates the oscillation frequency of the oscillator 55 by the resonance circuit of the inductor L and the capacitance Cs corresponding to the polarization domain formed, demodulates this modulated signal at the FM demodulator 56, and synchronously detects it at the signal detection device 57 with the AC signal of the AC signal generator 52 as the synchronous signal.

Next, the reproduction operation of the information recording apparatus 3 will be explained. The SW 1 is connected to the terminal a. The AC signal is applied to the probe 31 from the AC signal generator 52. This AC signal becomes the synchronous signal in the synchronous detection. When the probe 31 traces on the polarization domain, the capacitance Cs is detected, the resonance circuit is constructed by the capacitance Cs and the inductor L, and the oscillation frequency of the oscillator 55 is frequency-modulated with the resonance frequency. This frequency-modulated signal is demodulated at the FM demodulator 56, it is synchronously detected at the signal detection device 57 with the AC signal of the AC signal generator 52 as the synchronous signal, and the recorded information is reproduced.

Figure 11:
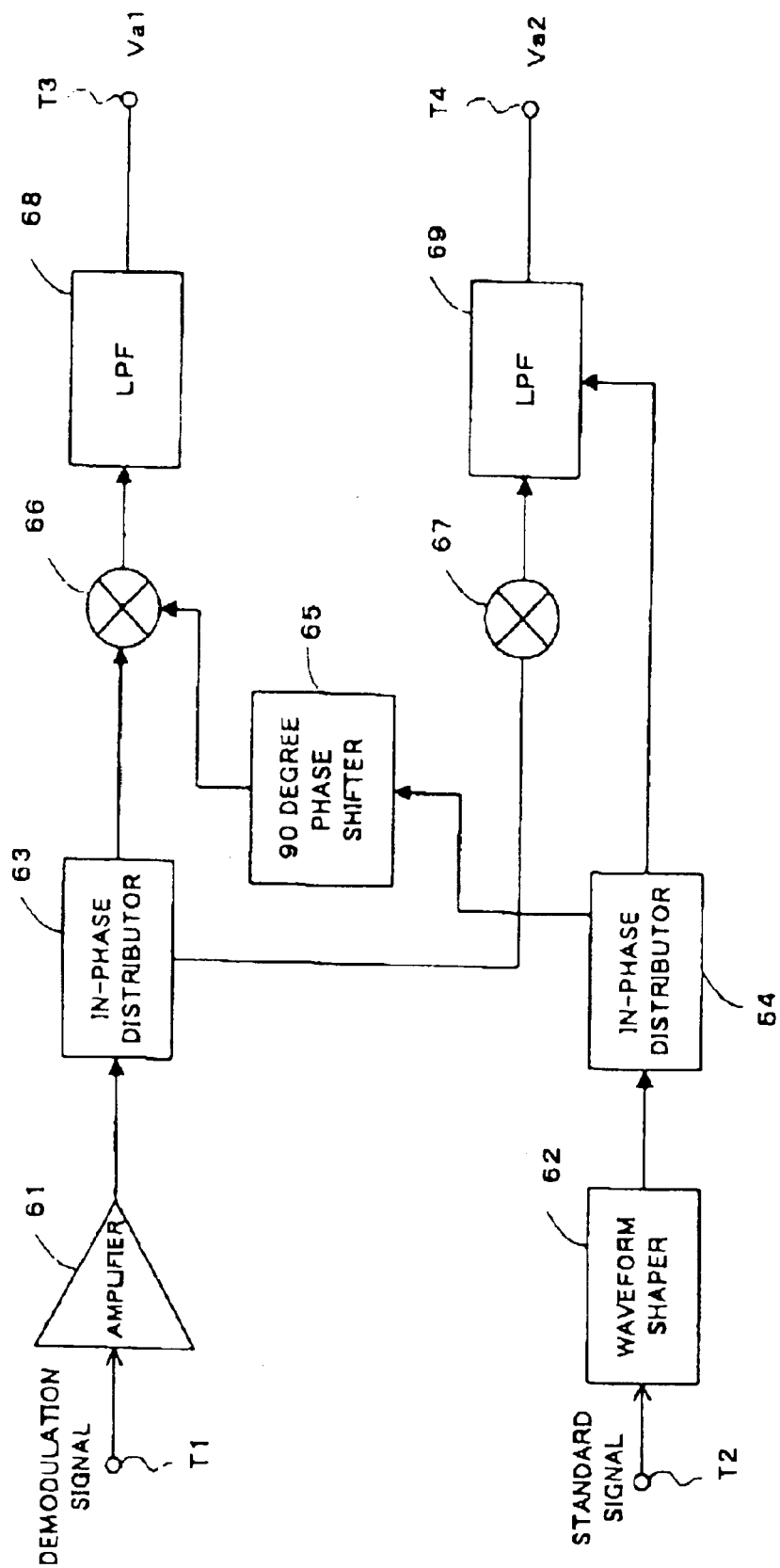
FIG. 11 is a schematic diagram to explain a structure of a lock-in amp used for signal detection and its signal detection operation.

As an apparatus used for the synchronous detection of the signal detection device 57, there is a lock-in amp. As shown in FIG. 11, it is provided with: input terminals T1 and T2; an amplifier 61; a waveform shaper 62, in-phase distributors 63 and 64; a 90 degree phase shifter 65; mixers 66 and 67, which are multipliers; low-pass filters 68 and 69; and output terminals T3 and T4.

The amplifier 61 amplifies a demodulation signal inputted through the input terminal T1 and outputs it to the in-phase distributor 63. The in-phase distributor 63 distributes the amplified demodulation signal in-phase and outputs it to the mixers 66 and 67. On the other hand, the waveform shaper 62 shapes a standard signal inputted through the input terminal T2 into a square wave and outputs it to the in-phase distributor 64. The in-phase distributor 64 distributes the standard signal outputted from the waveform shaper 62 in-phase and outputs it to the mixer 67 and the 90 degree phase shifter 65. The 90 degree phase shifter 65 shifts the standard signal only at 90 degrees at the frequency of the demodulation signal and outputs it to the mixer 66. The mixer 66 multiplies and mixes the demodulation signal and the standard signal shifted only at 90 degrees, converts it to a signal having the sum and the difference between the frequency of the demodulation signal and the frequency of the standard signal, and outputs it to the low-pass filter 68. The low-pass filter 68 passes only a DC (direct current) signal among the inputted signals after mixing and outputs an output voltage Va1 to the output terminal T3. The mixer 67 multiplies and mixes the standard signal and the demodulation signal, converts it to a signal having the sum and the difference between the frequency of the demodulation signal and the frequency of the standard signal, and outputs it to the low-pass filter 69. The low-pass filter 69 passes only the DC (direct current) signal among the inputted signals after mixing and outputs an output voltage Va2 to the output terminal T4.

The signal pickuped by a circuit having the function in this kind is reproduced with the AC signal of the AC signal generator 52 as the synchronous signal, and the recorded information is recreated. Incidentally, the method used for the synchronous detection is not limited to this lock-in amp.

The above information recording apparatus is described about the apparatus having one probe, but the apparatus having a plurality of probes is also available. In this case, the AC signal generator 52 requires the function of providing the different oscillation frequency from each other for each probe.

Moreover, as the dielectric recording medium, its shape can be various, such as a disk form, a tape form, a card form, and the like.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 2002-024663 filed on Jan. 31, 2002 and No. 2002-086592 filed on Mar. 26, 2002 each including the specification, claims, drawings and summary is incorporated herein by reference in its entirety.

What is claimed is:

1. A record condition extraction system of a dielectric recording medium for applying a voltage to the dielectric recording medium with a probe and extracting a record condition for recording information, the record condition extraction system comprising:
    an applied voltage setting device for setting an applied voltage to be applied to the dielectric recording medium;
    an applied time length setting device for setting an applied time length of the set applied voltage;
    a polarization domain formation device for applying a voltage to the dielectric recording medium from the probe on the basis of the set applied voltage and the set applied time length to form a polarization domain; and
    a measurement device for measuring a size of the polarization domain formed by said polarization domain formation device.

2. The record condition extraction system of the dielectric recording medium according to claim 1, comprising a detection device for detecting whether or not the polarization domain formed in the dielectric recording medium is stable and the smallest on the basis of a measurement result by said measurement device.

3. The record condition extraction system of the dielectric recording medium according to claim 2, further comprising a condition determination device for determining the applied voltage and the applied time length that have formed the polarization domain as an optimum record condition if the polarization domain is detected as being stable and the smallest by said detection device.

4. The record condition extraction system of the dielectric recording medium according to claim 2, comprising a condition determining device for determining an allowable range in the size of the polarization domain on the basis of the size of the polarization domain which is stable and the smallest detected by said detection device, and determining an applied voltage and an applied time length which are needed for forming the polarization domain having a size within the allowable range.

5. The record condition extraction system of the dielectric recording medium according to claim 1, wherein a plurality of polarization domains are formed in the dielectric recording medium by setting a plurality of applied voltages with said applied voltage setting device with respect to a predetermined applied time length set with said applied time length setting device.

6. The record condition extraction system of the dielectric recording medium according to claim 5, wherein
    said applied voltage setting device comprises:
    a device for setting an initial voltage of the applied voltage;
    a device for setting a step voltage to be added to the initial voltage; and
    a device for setting the number of adding the step voltage, and
    said applied voltage setting device sequentially adds the step voltage to the applied voltage whenever forming the polarization domain and automatically sets the applied voltage until reaching the set number.

7. The record condition extraction system of the dielectric recording medium according to claim 1, wherein a plurality of polarization domains are formed in the dielectric recording medium by setting a plurality of applied time length with said applied time length setting device with respect to a predetermined applied voltage set with said applied voltage setting device.

8. The record condition extraction system of the dielectric recording medium according to claim 7, wherein
    said applied time length setting device comprises:
    a device for setting an initial time length of the applied time length;
    a device for setting a step time length to be added to the initial time length; and
    a device for setting the number of adding the step time length, and
    said applied time length setting device sequentially adds the step time length to the applied time length whenever forming the polarization domain and automatically sets the applied time length until reaching the set number.

9. The record condition extraction system of the dielectric recording medium according to claim 1, comprising a memory device for memorizing:
    the applied voltage which is set by said applied voltage setting device and which is applied;
    the applied time length which is set by said applied time length setting device and for which the applied voltage is applied; and
    the size of the polarization domain measured by said measurement device.

10. The record condition extraction system of the dielectric recording medium according to claim 9, wherein information on the material and the thickness of the dielectric recording medium and on the radius of the probe applying the applied voltage is further memorized in said memory device.

11. The record condition extraction system of the dielectric recording medium according to claim 1, comprising an output device for outputting in a predetermined format:
    applied voltage information indicating the applied voltage which is set by said applied voltage setting device and which is applied;
    applied time length information indicating the applied time length which is set by said applied time length setting device and for which the applied voltage is applied; and
    size information indicating the size of the polarization domain measured by said measurement device.

12. The record condition extraction system of the dielectric recording medium according to claim 9, wherein said detection device detects whether or not the polarization domain formed in the dielectric recording medium is stable and the smallest on the basis of information memorized in said memory device.

13. The record condition extraction system of the dielectric recording medium according to claim 1, wherein information on the polarization domain which is stable and the smallest and which is detected by said detection device and on its size is outputted from said output device with information on the applied voltage which is set by said applied voltage setting device and which is applied and information on the applied time length which is set by said applied time length setting device and for which the applied voltage is applied.

14. The record condition extraction system of the dielectric recording medium according to claim 1, wherein the shortest applied time length setting by said applied time length setting device is performed on the basis of the value of coercive electric field intrinsic in the dielectric recording medium.

15. The record condition extraction system of the dielectric recording medium according to claim 1, wherein a dielectric material of the dielectric recording medium is a ferroelectric material.

16. The record condition extraction system of the dielectric recording medium according to claim 1, wherein a dielectric material of the dielectric recording medium is $LiTaO_3$.

17. The record condition extraction system of the dielectric recording medium according to claim 1, comprising a scanning nonlinear dielectric microscopy as said measurement device for measuring the size of the polarization domain.

18. An information recording apparatus of a dielectric recording medium for recording information by applying a voltage to the dielectric recording medium to form a polarization domain comprising:

an applied voltage setting device for setting an optimum applied voltage extracted from the record condition extraction system according to claim 1; and an applied time length setting device for setting an optimum time length of the voltage extracted from the record condition extraction system.

19. The information recording apparatus of the dielectric recording medium according to claim 18, comprising a record information reproducing device for reproducing the information recorded in the dielectric recording medium.

20. A record condition extraction method of a dielectric recording medium of applying a voltage to the dielectric recording medium with a probe and extracting a record condition for recording information, the record condition extraction method comprising:

an applied voltage setting process of setting an applied voltage to be applied to the dielectric recording medium;

an applied time length setting process of setting an applied time length of the set applied voltage;

a polarization domain formation process of applying the applied voltage to the dielectric recording medium on the basis of the set applied voltage and the set applied time length to form a polarization domain;

a measurement process of measuring a size of the polarization domain formed in said polarization domain formation process;

a detection process of detecting whether or not the polarization domain formed in the dielectric recording medium is stable and the smallest; and a condition determination process of determining an applied voltage and an applied time length that have formed the polarization domain as an optimum record condition if the polarization domain is detected as being stable and the smallest in said detection process.

21. The record condition extraction method of the dielectric recording medium according to claim 20, comprising a condition determining process of determining an allowable range in the size of the polarization domain on the basis of the size of the polarization domain which is stable and the smallest detected in said detection process, and determining an applied voltage and an applied time length which are needed for forming the polarization domain having a size within the allowable range.

22. The record condition extraction method of the dielectric recording medium according to claim 20, further comprising a memory process of memorizing:

the applied voltage which is set in said applied voltage setting process and which is applied;

the applied time length which is set in said applied time length setting process and for which the voltage is applied; and the size of the polarization domain measured in said measurement process.

23. The record condition extraction method of the dielectric recording medium according to claim 20, further comprising an output process of outputting in a predetermined format:

applied voltage information indicating the applied voltage which is set in said applied voltage setting process and which is applied;

applied time length information indicating the applied time length which is set in said applied time length setting process and for which the applied voltage is applied; and size information indicating the size of the polarization domain measured in said measurement process.

24. The record condition extraction method of the dielectric recording medium according to claim 22, wherein said detection process detects whether or not the polarization domain formed in the dielectric recording medium is stable and the smallest on the basis of information memorized in said memory process.

25. The record condition extraction method of the dielectric recording medium according to claim 20, wherein information on the polarization domain which is detected as being stable and the smallest in said detection process is outputted in said output process with information on the applied voltage which is set in said applied voltage setting process and which is applied and information on the applied time length which is set in said applied time length setting process and for which the applied voltage is applied.

* * * * *